(12) United States Patent
Wuester, Sr. et al.

(10) Patent No.: US 8,683,676 B1
(45) Date of Patent: Apr. 1, 2014

(54) APPARATUS AND METHOD TO GRIP A DISK CLAMP OF A DISK DRIVE

(75) Inventors: David Wuester, Sr., Chandler, AZ (US); Dean Albert Tarrant, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 241 days.

(21) Appl. No.: 13/097,455

(22) Filed: Apr. 29, 2011

(51) Int. Cl.
*G11B 5/127* (2006.01)
*H04R 31/00* (2006.01)

(52) U.S. Cl.
USPC ............ 29/603.03; 269/903; 269/21; 29/760; 29/283; 294/188

(58) Field of Classification Search
USPC ................. 269/20, 21, 903; 29/243.517, 283, 29/603.03, 760; 294/64.1, 188, 189, 183; 451/289, 388
See application file for complete search history.

(56) References Cited

U.S. PATENT DOCUMENTS

| 3,195,941 | A | * | 7/1965 | Morey | 294/189 |
| 4,006,929 | A | * | 2/1977 | Barker | 294/189 |
| 5,549,340 | A | * | 8/1996 | Nagai et al. | 294/189 |
| 5,704,599 | A | * | 1/1998 | Slothower | 269/21 |
| 5,820,800 | A | * | 10/1998 | Nagai et al. | 264/83 |
| 6,341,769 | B1 | * | 1/2002 | Lin et al. | 269/21 |
| 6,652,362 | B2 | * | 11/2003 | Boo et al. | 451/41 |
| 6,912,775 | B1 | * | 7/2005 | Pfeiffer et al. | 29/729 |
| 7,181,824 | B1 | * | 2/2007 | Suwito et al. | 29/603.03 |
| 7,631,912 | B2 | * | 12/2009 | Hupp | 294/189 |
| 7,690,869 | B2 | * | 4/2010 | Yo et al. | 406/88 |
| 7,712,807 | B2 | * | 5/2010 | Perlman et al. | 294/185 |
| 2002/0069509 | A1 | * | 6/2002 | Choo et al. | 29/603.03 |
| 2003/0209443 | A1 | * | 11/2003 | Lubomirsky | 205/137 |
| 2004/0231133 | A1 | * | 11/2004 | Hanssen et al. | 29/525.11 |
| 2005/0168001 | A1 | * | 8/2005 | Perlman et al. | 294/64.1 |

FOREIGN PATENT DOCUMENTS

EP          472354 A1 *  2/1992

* cited by examiner

*Primary Examiner* — Lee D Wilson
*Assistant Examiner* — Tyrone V Hall, Jr.

(57) ABSTRACT

Disclosed is a gripper for use with a disk clamp end effecter in a disk drive manufacturing process used for mounting a disk clamp to a disk in the manufacturing of a disk drive. The gripper comprises: a disk gripper housing, a lip seal gripper mounted to the disk gripper housing, and a vacuum channel. The lip seal gripper includes an upper portion that fits into the disk gripper housing and a lower portion that has a surface. The surface is configured to extend around the disk clamp to press against the disk clamp. The vacuum channel extends from the upper portion of the lip seal gripper to the lower portion of the lip seal gripper to provide a vacuum to the lip seal gripper such that the surface of the lip seal gripper is gripped by the vacuum to the surface of the disk clamp around the disk clamp.

20 Claims, 5 Drawing Sheets

APPARATUS AND METHOD TO GRIP A DISK CLAMP OF A DISK DRIVE

BACKGROUND

Computing devices are routinely used at work, at home, and everywhere else. Computing devices advantageously enable electronic communication, data sharing (e.g., documents, pictures, music, film, etc.), the use of application-specific software, and access to information for electronic commerce through the Internet and other computer networks.

The term computing device generally refers to desktop computers, server computers, laptop computers, mobile computing devices (e.g., personal digital assistants (PDAs), cell-phones, etc.), as well as any other type of computer system. A computing device typically includes a processor and a memory as well as other types of electronic devices, such as, a disk drive.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a disk clamp and a disk fastener (or screw) to mount the disk to a spindle motor that rapidly rotates the disk, and a head stack assembly ("HSA") that includes a moveable actuator arm and a head gimbal assembly ("HGA") with a moveable transducer head for reading and writing data. The HSA forms part of a servo control system that positions the moveable head over a particular track on the disk to read or write information from and to that track, respectively.

Due to the cost competiveness of the disk drive industry, the components of a disk drive need to be assembled in a very precise and cost effective manner. In order to be cost effective, complex components of the disk drive, such as disk clamps, disks, spindle motors, HDAs, HGAs, etc., need to be assembled in a very time effective manner with a very low error rate—even though many of the components require highly precise assembly. Also, many of these types of components often need to be assembled in a very clean fashion in which debris and contamination particles are kept to a minimum.

During the manufacturing of a disk drive, a disk dive end effecter is typically utilized to mount disk drive components into the disk drive. One particular type of disk drive end effecter is a disk clamp end effecter that is used for mounting a disk clamp to a disk and to the spindle motor of the disk drive in the manufacturing of a disk drive. The disk clamp end effecter typically grips the disk clamp, moves the disk clamp to the disk and the spindle motor, and attaches the disk clamp to the disk and spindle motor by utilizing a driver to drive a fastener (e.g., a screw) through the disk clamp to the spindle motor to secure the disk and the disk clamp to the spindle motor.

As disk drives are being actively utilized more and more both as moveable external disk drives and/or for use in smaller computing devices such as laptops and mobile devices (e.g. PDAs, cell-phones, etc.), they are increasingly requiring smaller and smaller components. Likewise, the disk clamp to mount the disk to the spindle motor is similarly becoming smaller. In particular, disk clamps have become so small that the area to pick-up the disk clamp and to move it to the disk drive for assembly has become much more complex.

Currently, the grippers used by disk clamp end effecters utilize a plurality of different cups placed in various locations to grasp to the disk clamp such that it can be lifted and placed into the disk drive to allow the driver of the disk clamp end effecter to screw the screw into the disk clamp and the spindle motor to secure the disk.

Unfortunately, the currently utilized gripping techniques are becoming less effective with smaller disk clamps. Oftentimes, the disk clamps are unable to be picked up or placed effectively into the disk drive. Because of this, the disk clamps are not easily and readily lifted, moved, and placed into the disk drive to allow the driver to screw the screw into the disk clamp to secure the disk clamp and the disk to the spindle motor. Such failures add a lot of time to the manufacturing process to fix such errors, damage a lot of disk drives such that they cannot be completed for manufacturing, and significantly increases the costs in the manufacturing process. Also, presently utilized grippers are typically constructed from metal which often causes metal to metal contacts when placing the disk clamp into the disk drive which may result in increased contamination. Moreover, current grippers may be difficult to maintain because they employ multiple displaced cups which often require maintenance and replacement.

Accordingly, more efficient techniques for a gripper to better grip the disk clamp are sought after.

DETAILED DESCRIPTION

Figure 1A:
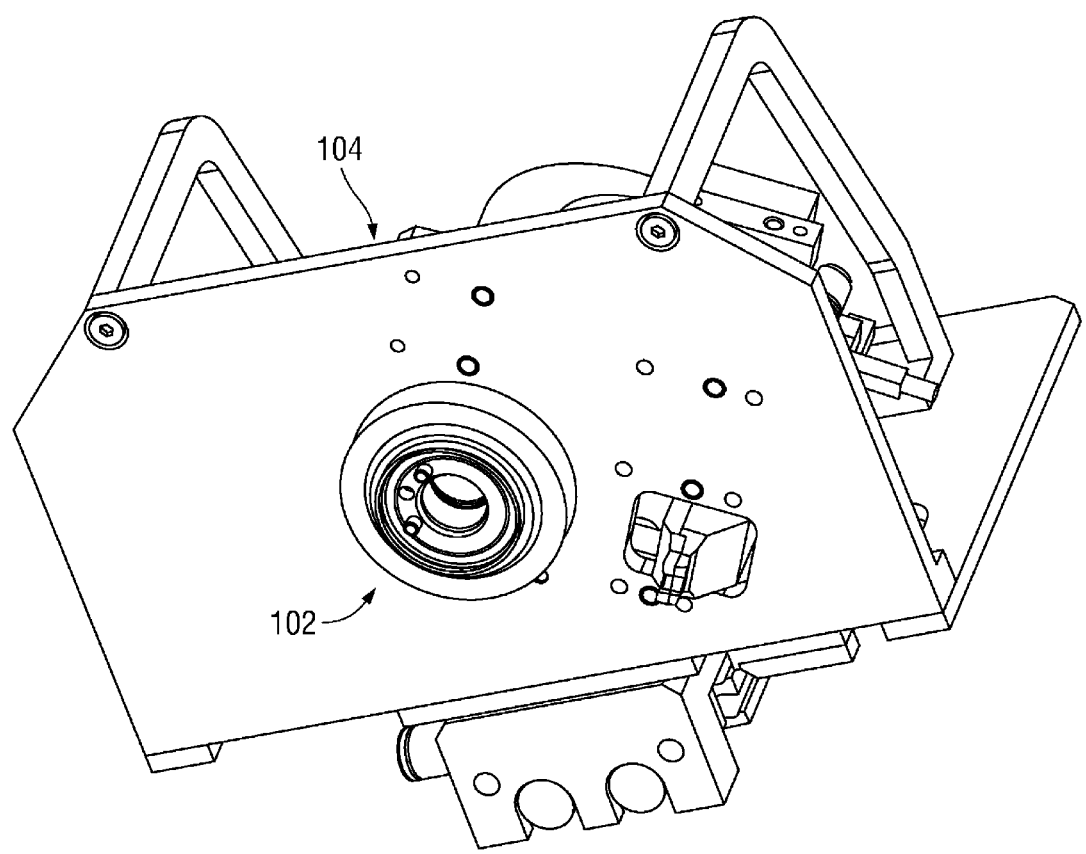
FIG. 1A is a bottom perspective view of a gripper, according to one embodiment of the invention, mounted to a disk clamp end effecter that is used in a disk drive manufacturing process to mount a disk clamp to a disk and a spindle motor in the manufacturing of a disk drive.

FIG. 1A is a bottom perspective view of a gripper 102, according to one embodiment of the invention, mounted to a disk clamp end effecter 104 that is used in a disk drive manufacturing process to mount a disk clamp to a disk and a spindle motor in the manufacturing of a disk drive. As previously described, disk clamp end effecters 104 are well known in the art for the disk drive manufacturing process in which disk clamps are placed upon the disk utilizing a gripper and then a screw (or multiple screws) are mounted through opening(s) of the disk clamp to connect the disk clamp and the disk to the spindle motor such that the spindle motor can spin the disk drive. The gripper 102 may be connected to the disk clamp end effecter 104 by conventional means: fasteners, screws, bolts, etc. The particular features of gripper 102, according to embodiments of the invention, will be hereinafter described.

Figure 1B:
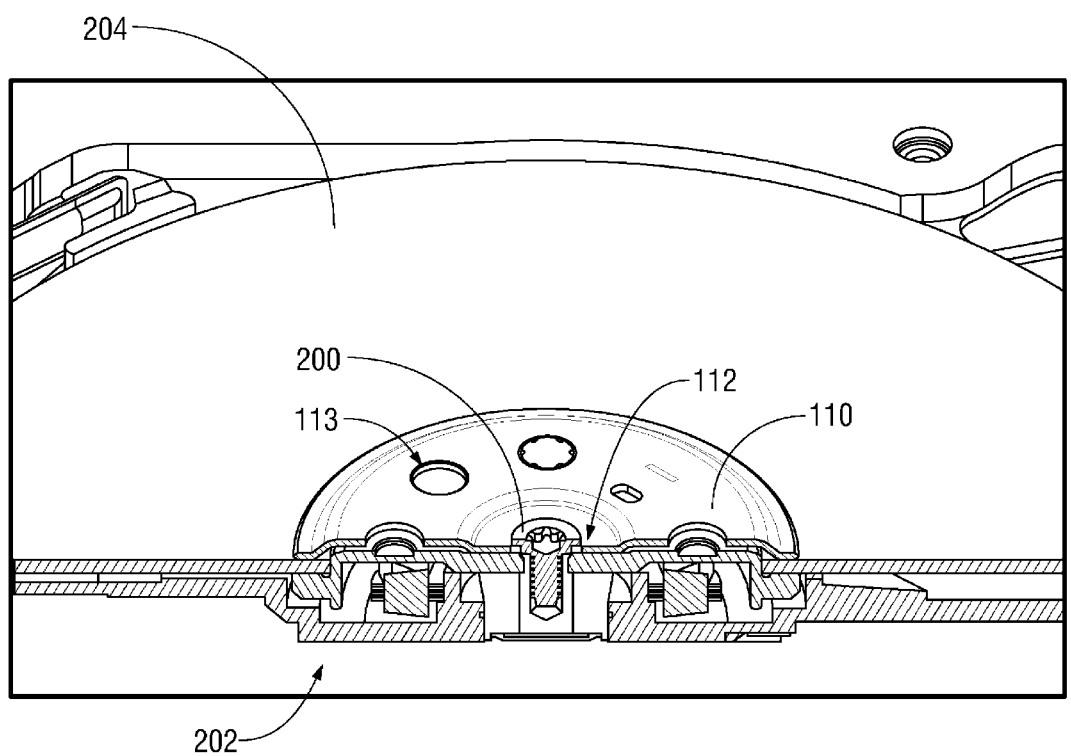
FIG. 1B is a sectional cut-away view of a disk clamp connected by a fastener (e.g., a clamp screw) to a spindle motor to thereby mount the disk to the spindle motor, that is shown for illustrative purposes.

But first, referring briefly to FIG. 1B, a sectional cut-away view of a disk clamp 110 connected by a fastener (e.g., a clamp screw) 200 to a spindle motor 202 to thereby mount the disk 204 to the spindle motor 202 is shown for illustrative purposes. This may be achieved by utilizing the disk drive end effecter that utilizes a driver (e.g., with a torx bit) to mount the clamp screw 200 to the disk clamp 110 and the spindle motor

202. In this example, only a central screw 200 is utilized through a center hole 112, however, it should be appreciated that multiple screws through various holes 113 of the disk clamp 110 may be utilized. Further, this may achieved in conjunction with a utilizing gripper 102, according to embodiments of the invention, as will be described in detail hereinafter.

Figure 2:
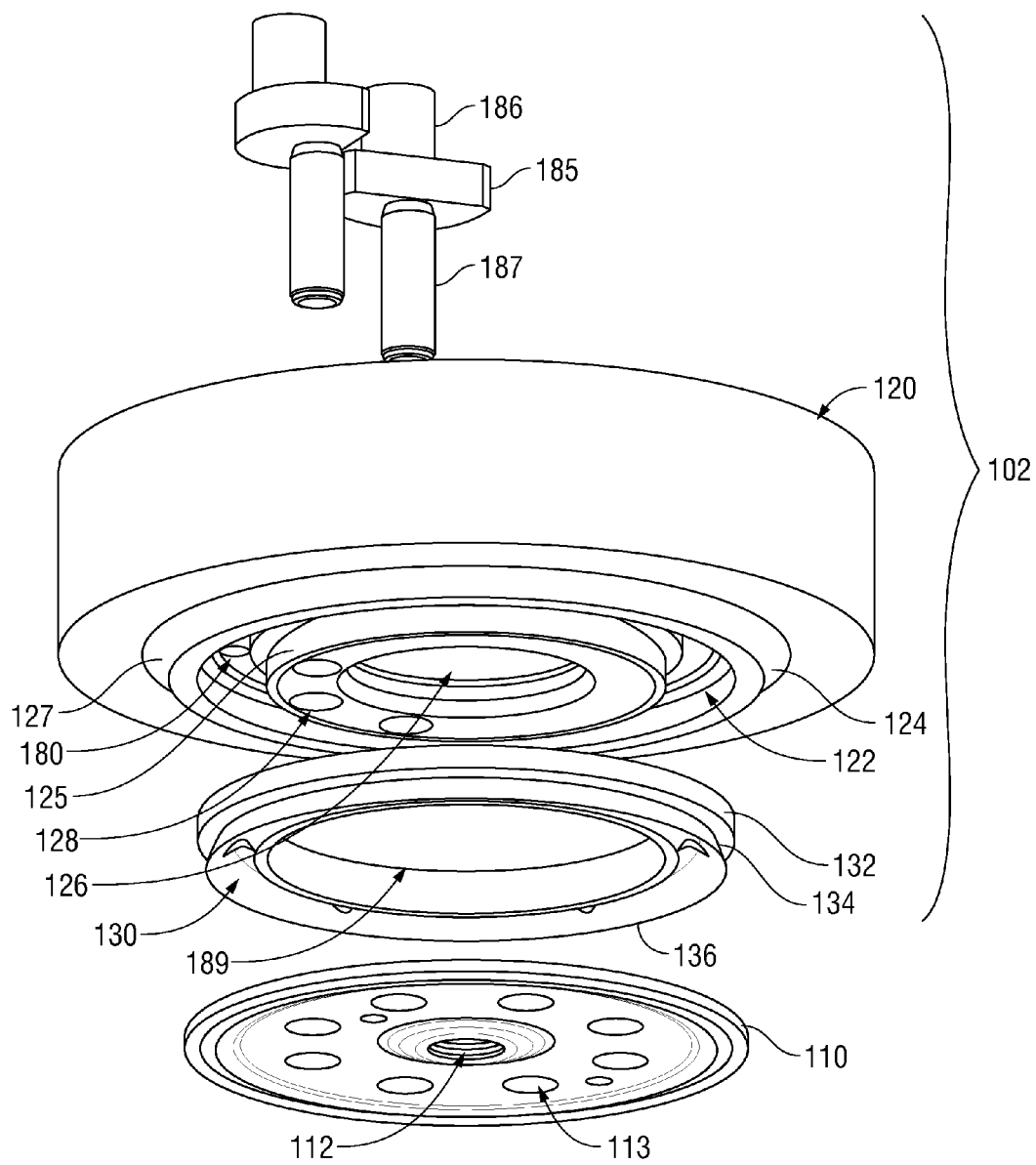
FIG. 2 is an exploded view of the gripper, according to one embodiment of the invention.

With reference to FIG. 2, an exploded view of gripper 102, according to embodiments of the invention, is illustrated. Gripper 102 has been found to optimally grip to a disk clamp 110 such that it may be utilized in conjunction with disk clamp end effecter to: lift the disk clamp 110; move the disk clamp 110 to an appropriate location in the disk drive above the disk 204 and over the spindle motor 202 with improved XYZ coordinate control (e.g., all directions—roll, pitch, and yaw); and hold the disk clamp 110 in place while the driver of the end effecter screws a screw 200 into the center hole 112 of the disk clamp 110 such that the disk clamp and the disk are securely connected to the spindle motor for rotation by the spindle motor.

In one embodiment, the disk clamp is generally circular-shaped and has a center hole 112 and a plurality of circumferential outer holes 113. In some embodiments, a single screw is screwed through the center hole to secure the disk clamp 110 to the spindle motor. However, in other embodiments, multiple screws may be screwed through the multiple outer holes to secure the disk clamp and disk to the spindle motor.

In particular, disk gripper 102 may include a disk gripper housing 120 and a lip seal gripper 130 mounted to the disk gripper housing 120. Both the disk gripper housing 120 and the lip seal gripper 130 may be approximately circular-shaped. The lip seal gripper 130 may include a circular upper portion 132 that fits into a correspondingly-sized channel 122 of a lower portion 124 of the disk gripper housing and includes a central opening 189. The lower portion 124 of the disk gripper housing 120 forms a channel 122 between a circular-shaped extending wall 127 and an internal circular-shaped portion 125 that defines an internal opening 126 and a plurality of spanner holes 128.

The upper portion 132 of the lip seal gripper 130 may fitted into the channel 122 of the disk gripper housing 120. In this way, the upper portion 132 of the lip seal gripper 130 can be press fit (or dove-tail fit) into the channel 122 of the disk gripper housing 102. Further, the lip seal gripper 130 includes a circular angle-shaped lower portion 134 having a surface 136 that is configured to extend around the disk clamp 110 to press against the disk clamp 110 and to grip the disk clamp for use in the disk drive manufacturing process by the disk clamp end effecter.

Figure 3:
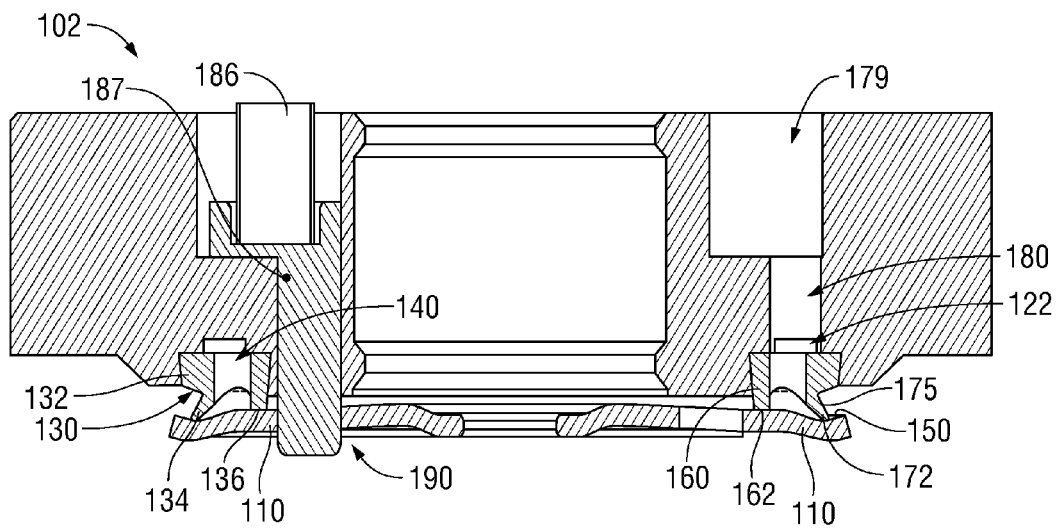
FIG. 3 is a side partial-sectional view of the gripper, according to one embodiment of the invention.
Figure 4:
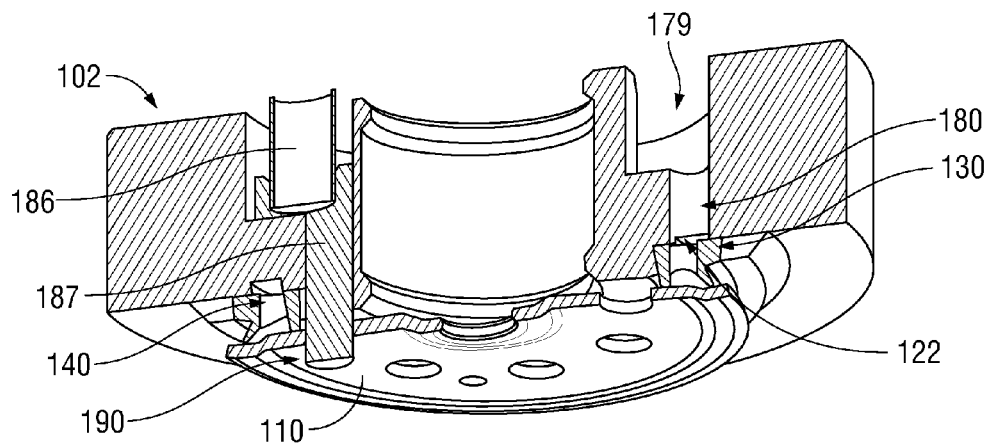
FIG. 4 is a perspective sectional view of the gripper, according to one embodiment of the invention.
Figure 5:
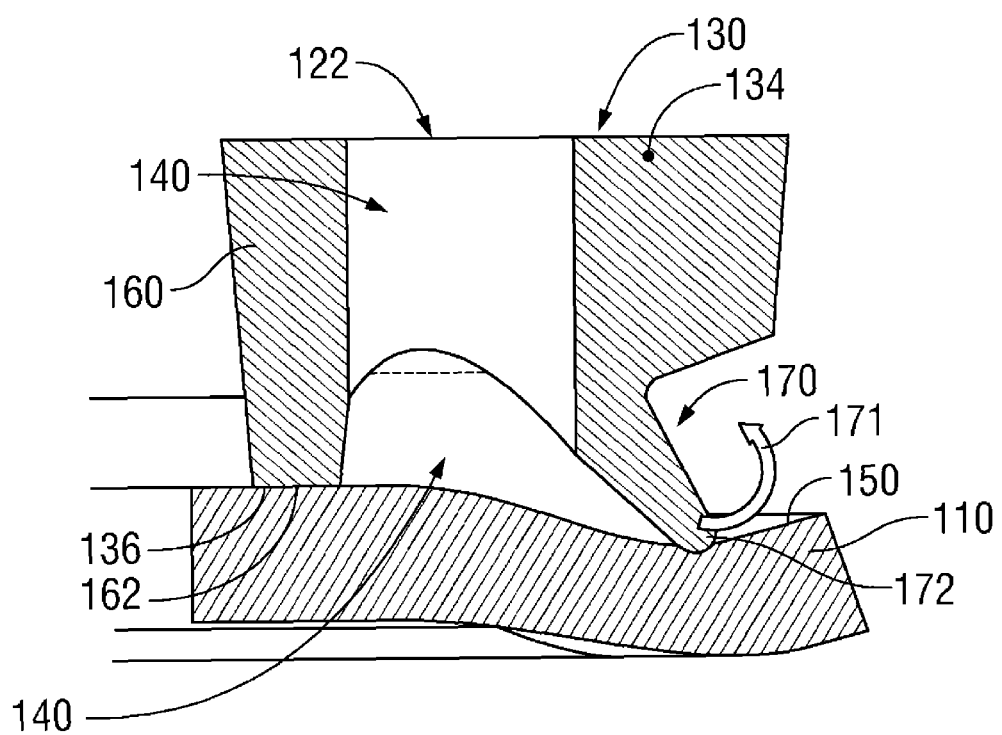
FIG. 5 is a cross-sectional view of the lip seal gripper, according to one embodiment of the invention.

With reference also to FIGS. 3-5, additional elements of the disk gripper 102 will be described. In particular, lip seal gripper 130 includes a vacuum channel 140 that extends from the upper portion 132 of the lip seal gripper 130 through to the lower portion 134 of the lip seal gripper 130 to provide vacuum suction to the lip seal gripper such that the surface 136 of the lip seal gripper is gripped by vacuum suction to the surface 150 of the disk clamp 110 around the disk clamp 110 such that the disk clamp may be securely mounted to the disk and the spindle motor.

Further, in one embodiment, the lower portion 134 of the lip seal gripper 130 includes a hard stop foot section 160 that has a straight surface 162 that presses against the top portion of the disk clamp 110. The hard stop foot section 160 may be approximately vertically-shaped. The hard stop foot section 160 provides a positive vertical reference height and firmly stops the lip seal gripper 132 on the top portion of the disk clamp 110 and prevents it from moving down in the vertical direction. In particular, because of the vertical geometry, it provides a relatively hard solid seal.

Additionally, the lower portion 134 of the lip seal gripper 130 includes a flexible foot section 170 that is approximately angularly shaped that includes a convex surface 172 that presses against a lower portion of the disk clamp 110 to further provide a seal. In particular, the flexible foot section 170 with the convex surface 172 makes it beneficial for mating with the variable surfaces of the disk clamp 110 such that it can swing up as shown by arrow 171 to adapt to the surface of the disk clamp.

In one embodiment, the disk gripper housing 120 may comprise a plastic material. The lip seal gripper 130 may comprise a flexible plastic material, such as, a polyurethane material or a rubber. The polyurethane material of the lip seal gripper 130 and the plastic material of the disk gripper housing 120 make it beneficial for use in a clean-room environment for the assembly of the disk clamp to the disk and the spindle motor. In one particular embodiment, a polyurethane material for the lip seal gripper may be a PU-90 DUROMETER material.

In order to apply the vacuum suction to the vacuum channel 140 of the lip seal gripper 130, the vacuum suction is applied from the disk gripper housing 120. The vacuum suction to the disk gripper housing 120 may be applied from an appropriate suction device from the disk clamp end effecter. In particular, the vacuum suction is applied internally to a circumferential channel 179 of the disk gripper housing 120 and through one or more holes 180 to the other channel 122 of the disk gripper housing and thereby to the vacuum channel 140 of the lip seal gripper 130. As shown in FIGS. 2-4, only one hole 180 is shown. However, it should be appreciated that any suitable number of holes may be utilized. For example, in one embodiment, four holes are utilized.

By applying the vacuum suction through the vacuum channel 140 of the lip seal gripper 130, the surface 136 of the lip seal gripper is securely gripped by the vacuum to the surface 150 of the disk clamp 110 around the disk clamp so that the disk clamp is securely mountable to the disk.

Further, a spring loaded spanner pin 185 having springs 186 and spanner pins 187 is mounted through the disk gripper housing 120 to the disk clamp 110. In particular, the spanner pins 187 may extend through spanner pin holes 126 of the disk gripper housing 120 through the central opening 189 of the lip seal gripper 130 and into corresponding holes 113 of the disk clamp 110. The spanner pins may be placed in the corresponding holes 113 of the disk clamp 110 such that the disk clamp 110 stays in place and is prevented from rotating while the driver of the disk clamp end effecter screws the appropriate screw(s) 200 into the appropriate hole(s) 112 and 113 of the disk clamp to secure the disk clamp 110 to the disk 204 and the spindle motor 202 (e.g., see FIG. 1B). It should be noted that any suitable number of spanner pin holes may be formed in the disk gripper housing. Additionally, the spring loaded spanner pin 185 may have springs 186 such that the springs 186 can retract in case the spanner pin 187 comes in contact vertically with an object. Ideally, a spanner pin 186 does not come in contact with components of the disk drive in the vertical direction but is simply placed within appropriate holes 113 of the disk clamp 110 to prevent rotation of the disk clamp. It should be appreciated that a wide variety of different types of spring loaded spanner pins with different amounts of spanner pins may be utilized.

By utilizing the previously-described gripper 102 including disk gripper housing 120 and lip seal gripper 130, a relatively large amount of vacuum suction is applied completely and circumferentially around to the outer portion of the disk clamp 110 to provide a very secure gripping system. Further, because the lip seal gripper 130 is formed from a flexible plastic material, such as, polyurethane, there are very few metal to metal contacts during the clamping of the disk clamp 110 which significantly reduces contamination.

In particular, when the disk drive end effecter utilizes its driver to mount the clamp screw 200 through the disk clamp 110 to mount to the spindle motor 202 thereby mounting the disk 204 to the spindle motor 202 (within the central opening 189 of the lip seal gripper 130), because the lip seal gripper 130 extends completely around the outside portion of the disk clamp 110, a very secure gripping to the disk clamp 110 is provided that controls movement in all directions (XYZ—pitch, yaw, and roll) to provide a very secure environment for the mounting of the screw(s) and further prevents contamination from extending outside of the boundaries provided by the lip seal gripper 134.

While embodiments of the invention and their various mechanical and functional components have been described in particular embodiments, it should be appreciated that the embodiments can be implemented with a wide variety of differing mechanical and electrical components, and combinations thereof. Further, although the previous embodiments have been described as being employed for use with disk drives, these embodiments may be implemented with numerous other types of disk drives or other types of storage devices with similar or other media format characteristics.

That which is claimed is:

1. A method for mounting a disk clamp to a disk in the manufacturing of a disk drive, the method comprising:
    pressing a lower portion of a lip seal gripper against a disk clamp, wherein the lower portion of the lip seal gripper includes a surface that is configured to extend around the disk clamp to press against the disk clamp;
    applying a vacuum force through a vacuum channel extending from an upper portion of the lip seal gripper to the lower portion of the lip seal gripper such that the surface of the lip seal gripper is gripped by the vacuum force to the surface of the disk clamp around the disk clamp;
    placing the disk clamp onto a disk with the lip seal gripper; and
    mounting the disk clamp to the disk.

2. The method of claim 1, wherein the upper portion of the lip seal gripper is press fit into a disk gripper housing.

3. The method of claim 1, wherein the lip seal gripper is approximately circular shaped.

4. The method of claim 1, wherein the lower portion of the lip seal gripper includes a hard stop foot section having a straight surface that presses against a top portion of the disk clamp.

5. The method of claim 4, wherein the hard stop foot section is approximately vertically shaped.

6. The method of claim 1, wherein the lower portion of the lip seal gripper includes a flexible foot section having a convex surface that presses against a lower portion of the disk clamp to provide a seal.

7. The method of claim 6, wherein the flexible foot section is approximately angularly shaped.

8. The method of claim 1, wherein the disk gripper housing comprises a flexible plastic material.

9. The method of claim 1, wherein the lip seal gripper comprises a plastic material.

10. The method of claim 9, wherein the lip seal gripper comprises a polyurethane material.

11. A system for mounting a disk clamp to a disk in the manufacturing of a disk drive, the system comprising:
    a disk;
    a disk clamp; and
    a disk clamp end effector comprising:
        a) a gripper including:
            i) a disk gripper housing;
            ii) a lip seal gripper mounted to the disk gripper housing, the lip seal gripper including an upper portion that fits into the disk gripper housing and a lower portion having a surface, the surface configured to extend around said disk clamp to press against said disk clamp, the lip seal gripper including a vacuum channel extending from the upper portion of the lip seal gripper to the lower portion of the lip seal gripper;
        b) a suction device, wherein the suction device applies a vacuum force through the vacuum channel extending from the upper portion of the lip seal gripper to the lower portion of the lip seal gripper such that the surface of the lip seal gripper is gripped by the vacuum force to the surface of the disk clamp around the disk clamp so that the disk clamp is secured while placed onto the disk by the disk clamp end effector; and
        c) a driver to mount the disk clamp to the disk with a fastener.

12. The system of claim 11, wherein the upper portion of the lip seal gripper is press fit into the disk gripper housing.

13. The system of claim 11, wherein the lip seal gripper is approximately circular shaped.

14. The system of claim 11, wherein the lower portion of the lip seal gripper includes a hard stop foot section having a straight surface that presses against a top portion of the disk clamp.

15. The system of claim 14, wherein the hard stop foot section is approximately vertically shaped.

16. The system of claim 11, wherein the lower portion of the lip seal gripper includes a flexible foot section having a convex surface that presses against a lower portion of the disk clamp to provide a seal.

17. The system of claim 16, wherein the flexible foot section is approximately angularly shaped.

18. The system of claim 11, wherein the disk gripper housing comprises a flexible plastic material.

19. The system of claim 11, wherein the lip seal gripper comprises a plastic material.

20. The system of claim 19, wherein the lip seal gripper comprises a polyurethane material.

\* \* \* \* \*